United States Patent
Tully et al.

(10) Patent No.: US 6,367,623 B1
(45) Date of Patent: Apr. 9, 2002

(54) METHOD AND APPARATUS FOR STORING AND CIRCULATING ELECTRONIC STORAGE DEVICES

(75) Inventors: Carol Thompson Tully; Deanna L. Kern; Glenora A. Justice, all of Indianapolis, IN (US)

(73) Assignee: Taped Editions, Inc., Indianapolis, IN (US)

( * ) Notice: Subject to any disclaimer, the term of this patent is extended or adjusted under 35 U.S.C. 154(b) by 0 days.

(21) Appl. No.: 09/625,705

(22) Filed: Jul. 25, 2000

(51) Int. Cl.⁷ ............................................. B65D 69/00
(52) U.S. Cl. .................. 206/232; 206/459.2; 206/472
(58) Field of Search ........................... 206/232, 308.1, 206/312, 387.13, 459.5, 472

(56) References Cited

U.S. PATENT DOCUMENTS

| | | | |
|---|---|---|---|
| 3,352,027 A | | 11/1967 | Schwartz |
| 4,058,916 A | * | 11/1977 | Whyatt ......................... 40/107 |
| 4,154,338 A | | 5/1979 | Adler |
| 4,432,827 A | | 2/1984 | Graetz et al. |
| 4,501,359 A | | 2/1985 | Yoshizawa |
| 4,717,021 A | | 1/1988 | Ditzig |
| 4,778,051 A | | 10/1988 | Schaub et al. |
| 4,784,264 A | | 11/1988 | Sykes |
| 5,207,717 A | * | 5/1993 | Manning ..................... 206/232 |
| 5,263,581 A | * | 11/1993 | Rosen ......................... 206/313 |
| 5,568,863 A | | 10/1996 | Weavers |

* cited by examiner

Primary Examiner—David T. Fidei
(74) Attorney, Agent, or Firm—Maginot, Addison & Moore

(57) ABSTRACT

An apparatus for storing at least one electronic storage device comprises an enclosure, an overlay, and a removable insert. The enclosure has at least one storage cell and an outer cover. The storage cell is configured to receive at least one electronic storage device. The overlay is attached to the outer cover and includes a first area in which indicia disposed beneath the overlay is visibly exposed. The removable insert is received between the outer cover and the overlay, and has a substantially transparent area that overlaps at least partially with the first area of the overlay.

22 Claims, 5 Drawing Sheets

METHOD AND APPARATUS FOR STORING AND CIRCULATING ELECTRONIC STORAGE DEVICES

FIELD OF THE INVENTION

The present invention relates to methods and apparatus for storing, circulating and packaging analog and digital electronic storage devices, including video and audio tapes and disks.

BACKGROUND OF THE INVENTION

Many establishments lend audio-visual materials through electronic storage devices such as, for example, audio tapes, video tapes, compact disks, and digital video disks. Such establishments lend such materials on either a fee or non-fee basis. At present, lending establishments include video rental stores, libraries, supermarkets, convenience stores, truck stops, fitness centers, and other consumer retail establishments.

These retail establishments often obtain electronic storage devices by leasing them from a distributor, as opposed to purchasing them outright. Thus, the distributor acts as a primary lender and the retail establishment operates as a secondary lender. At the end of the lease period, the retail establishment returns the storage media to the distributor and the distributor may re-circulate the storage media to another secondary lender. This two-layered lending hierarchy allows for establishments with limited funding, for example, public libraries, to obtain a wider selection of materials. The two-layered lending hierarchy has been particularly popular in the circulation of books recorded on audio tape.

The multi-layered lending hierarchy, however, has created an issue with regard to the protective cases in which storage media are contained. In particular, protective containers or cases are used to facilitate the circulation of storage media to the public. Such storage cases are typically durable, portable, and include a cover upon which information identifying the contents of the storage media, e.g., the title of the work, is provided. One problem encountered in the trafficking of storage media in a primary and secondary lending structure is the defacement of the storage case by the secondary lender (or other establishment).

For example, libraries often affix various library-specific materials to the protective storage case, including bar code labels, library identification information, and data due stickers or charts. Such materials are typically affixed via adhesive and are often difficult to remove. Thus, when the library returns the electronic storage device to the primary lender, the primary lender must expend resources to "clean" the storage case to enable its re-use for subsequent lending transactions.

Nevertheless, it is critical that such materials include secondary lender information and materials to facilitate the consumer interaction aspect of the secondary lender business. In particular, the secondary lender must be able to affix their own barcode label to expedite consumer lending operations and to facilitate tracking.

There is a need, therefore, for a method and apparatus for circulating electronic storage devices that reduces the effort required by a primary lender to prepare the media and its protective case for recirculation.

SUMMARY OF THE INVENTION

The present invention addresses the above needs, as well as others, by providing an apparatus for storing an electronic storage device that includes an attached overlay and a removable insert. The attached overlay forms a pocket or sleeve in which the removable insert may be disposed. The removable insert and attached overlay are configured such that first indicia located beneath the pocket and removable insert is visible and second indicia located on the removable insert within the pocket is also visible. Thus, first indicia, including, for example, the title of the enclosed work, is visible to the consumer as is second indicia, for example, secondary lender information. Moreover, when the apparatus is returned to a primary lender, the removable insert, which may contain secondary lender information, may be discarded and replaced with a new removable insert. The use of the overlay and removable insert in a protective case for electronic storage media according to the present invention thus facilitates recirculation to various secondary lenders without labor-intensive operations to "clean" off adhesive labels and other materials relating to a prior secondary lender.

In one embodiment of the present invention, an apparatus for storing at least one electronic storage device comprises an enclosure, an attached overlay, and a removable insert. The enclosure has at least one storage cell and an outer cover. The storage cell is configured to receive at least one electronic storage device. The overlay is attached to the outer cover and includes a first area in which indicia disposed beneath the overlay is visibly exposed. The removable insert is received between the overlay and the outer cover, and has a substantially transparent area that overlaps at least partially with the first area of the overlay.

Another embodiment of the present invention is a method of lending electronic storage devices to one or more secondary lenders that includes a step of providing a first secondary lender with an enclosure, the enclosure including a storage cell containing an electronic storage device and further including an outer cover. The method also includes a step of providing an overlay that is disposed on the outer cover. Also provided to the first secondary lender is first indicia that is associated with the electronic storage device. The first indicia is visible through the overlay. The method further includes the step of providing the first secondary lender with a removable insert, the removable insert including a substantially transparent area through which at least part of the first indicia is visible. The removable insert is configured to receive second indicia provided by the first secondary lender. The removable insert is further configured to be received between the outer cover and the overlay.

Thus, the present invention facilitates recirculation of electronic storage device by providing a method and apparatus that allows a secondary lender, such as a library, to affix information specific to the secondary lender on a removable and replaceable insert. The cover and removable insert allow visual exposure of indicia disposed on or against the cover itself. The primary lender may then replace the insert with a clean insert when the electronic storage device is provided to another secondary lender.

The above described features and advantages, as well as others, will become more readily apparent to those of ordinary skill in the art by reference to the follow detailed description and accompanying drawings.

DETAILED DESCRIPTION

Figure 1:
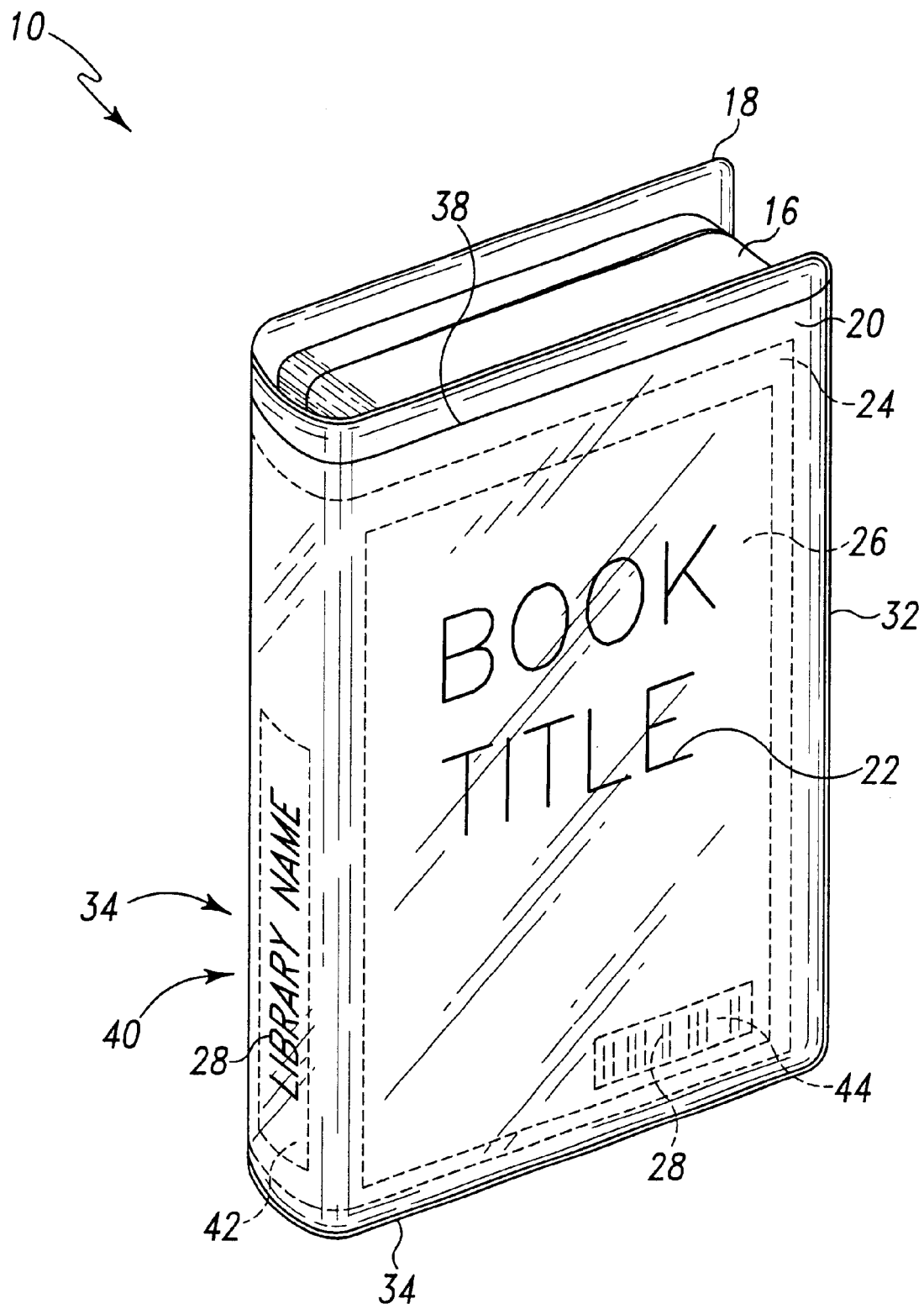
FIG. 1 shows a perspective view of an exemplary storage apparatus according to the present invention wherein the storage apparatus is in a closed state.

FIGS. 1, 2, 3 and 4 show in various views an exemplary storage apparatus 10 according to the present invention. The storage apparatus 10 is an audio tape storage container that stores at least one electronic storage device 12, shown here by way of example as four audio tapes. The four audio tapes may suitably comprise an audio book. It will be appreciated, however, that the electronic storage device 12 may alternatively be another form of magnetic tape, such as a video tape or digital audio tape. Alternatively, the storage apparatus 10 may readily be configured to store optical media such as digital video disks or compact audio disks of various sizes.

The storage apparatus 10 includes an enclosure 14, an overlay 20 and a removable insert 24. The enclosure 14 includes at least one storage cell 16 and an outer cover 18. The storage cell(s) 16 are configured to receive the at least one electronic storage device 12. Accordingly, in the exemplary embodiment described herein, the enclosure includes four storage cells 16 to accommodate the four audio tape electronic storage devices 12. The outer cover 18 constitutes the external surface of the enclosure 14.

Figure 2:
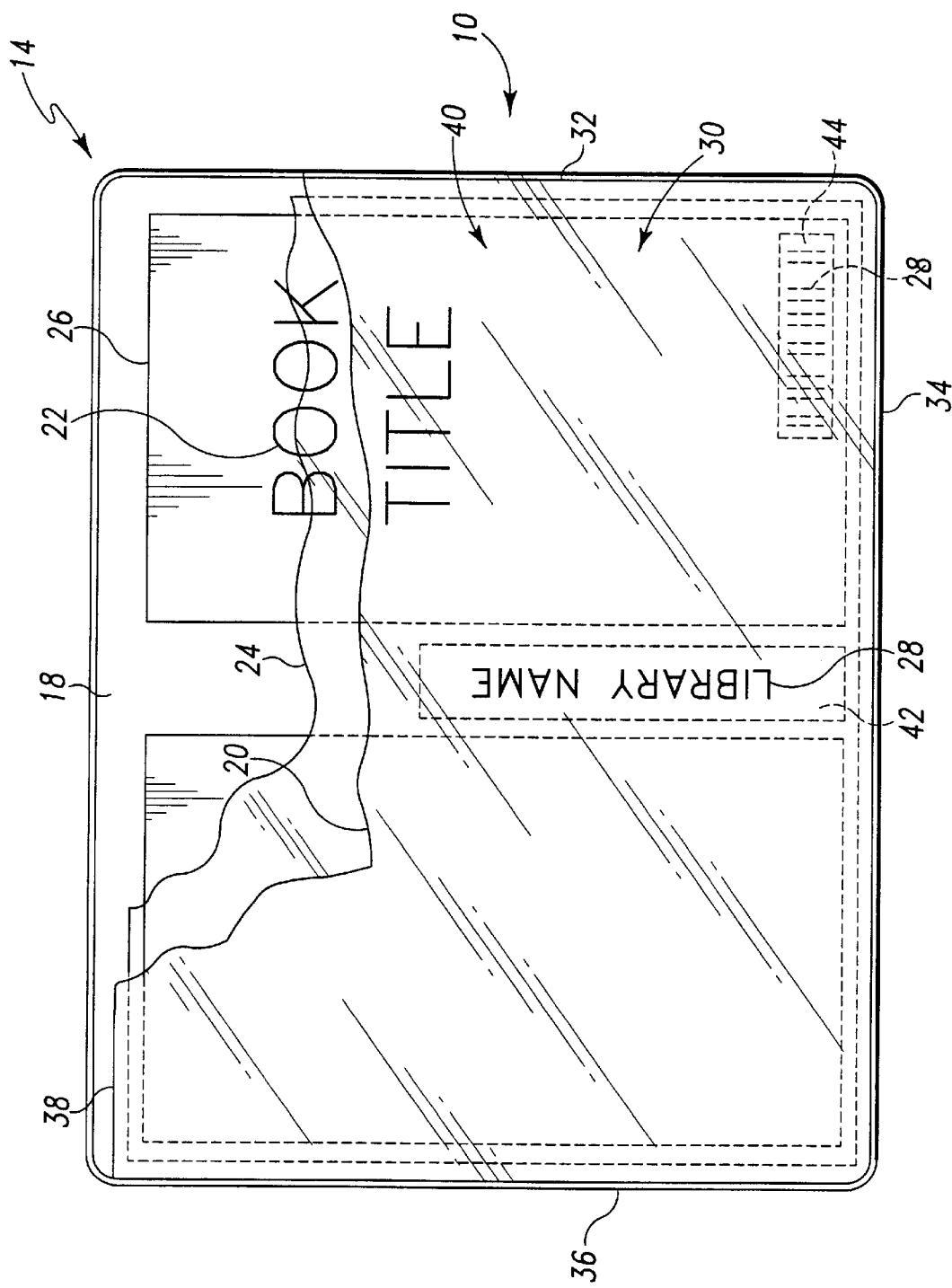
FIG. 2 shows a plan view of the storage apparatus of FIG. 1 wherein the storage apparatus is in an open state.
Figure 3:
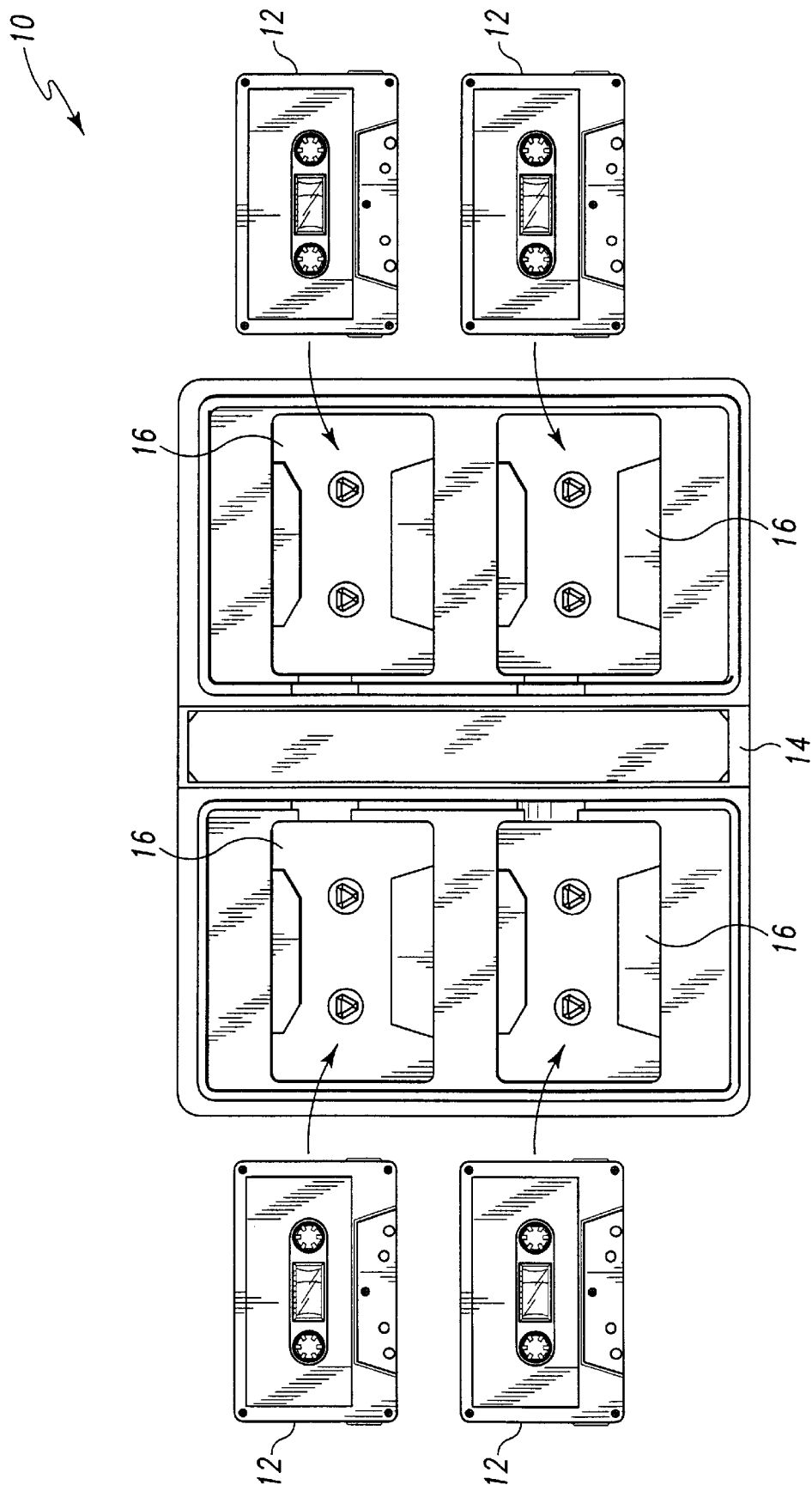
FIG. 3 shows a perspective view of the storage apparatus of FIG. 1 in the open state.
Figure 4:
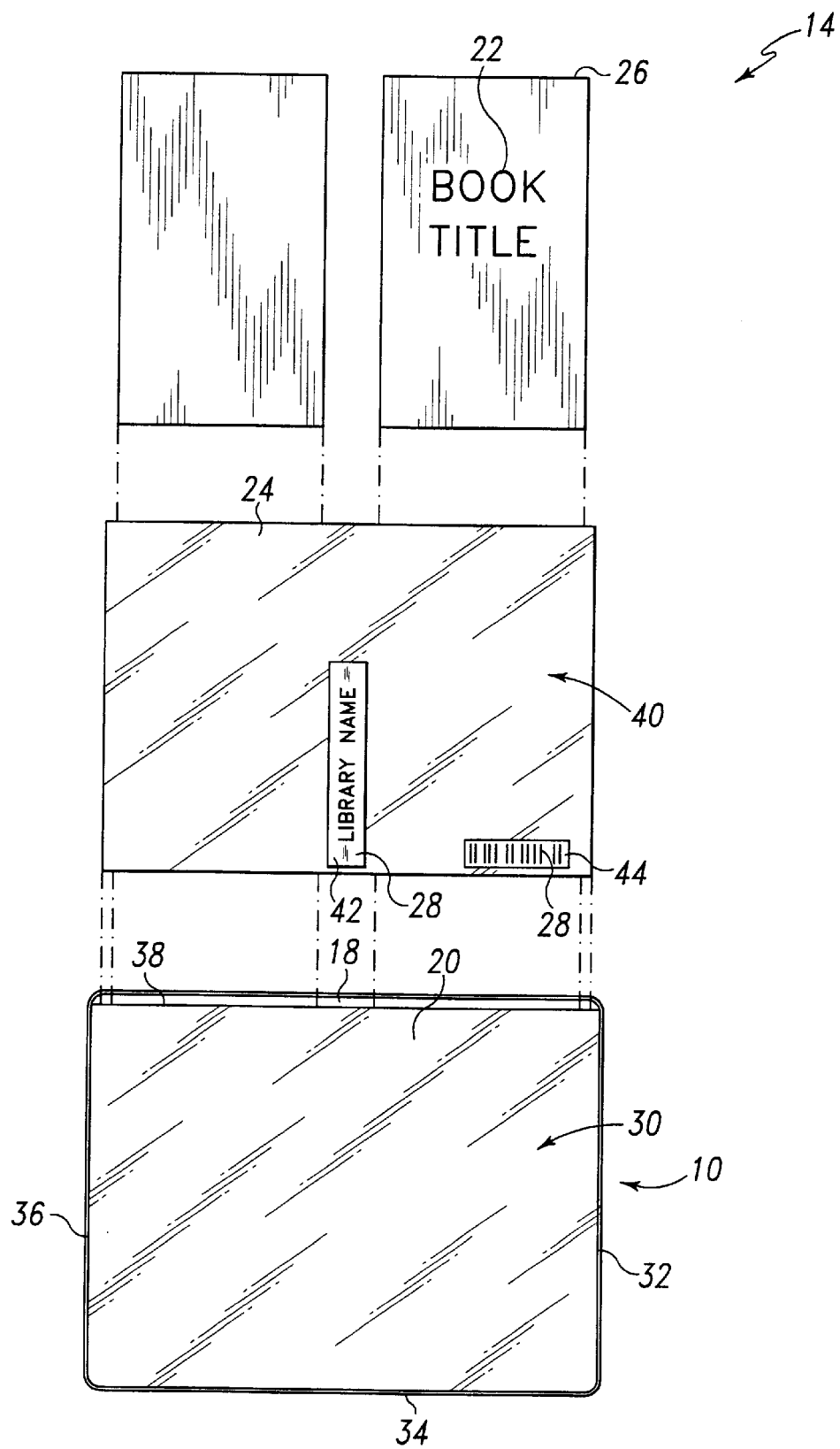
FIG. 4 shows an exploded plan view of the storage apparatus of FIG. 1 in the open state.

In the exemplary embodiment described herein, the enclosure 14 forms a closeable book-like structure in which the storage cell(s) 16 occupy the space within the folded over outer cover 18. FIG. 1 shows the outer cover 18 of the enclosure 14 in its closed state. FIGS. 2, 3 and 4 show the outer cover 18 enclosure 14 in its fully open state. In the fully open state, the electronic storage device 12 may be removed from the enclosure 14.

It will be noted that in alternative embodiments, the enclosure 14 need not take the form of a closeable book-like structure. For example, certain video tape enclosures take the form of an open ended box. In such a case, the open-ended box would form both the storage cell 16 and the outer cover 18 of the enclosure 14. Further discussion of such an embodiment is provided below in connection with FIGS. 5 and 6.

Referring again to the embodiment of FIGS. 1, 2, 3 and 4, the overlay 20 is disposed on the outer cover 18 and includes a first area 30 in which indicia disposed beneath the overlay 20 is visibly exposed. Accordingly, first indicia 22 that is disposed on or against the outer cover 18 and beneath the overlay 20 may be viewed by an observer when it is aligned with the first area 30.

The first indicia 22 may suitably include information regarding the contents of the electronic storage device 12. For example, the first indicia 22 may include the title, author and performer credits for the work stored on the electronic storage device 12. The first indicia 22 may suitably be printed directly on the outer cover 18, or may be printed on an indicia insert 26 as shown in FIGS. 1, 3 and 4. The indicia insert 26 in the exemplary embodiment described herein comprises a rectangular piece of paper that has dimensions slightly smaller than the dimensions of the overlay 20.

It is noted that other indicia may be present on the outer cover 18 or on the indicia insert 26 that is not within the first area 30 and therefore is not necessarily visible. Moreover, it will be appreciated that if an indicia insert 26 is used, it may itself conceal, in part or in whole, any indicia printed directly on the outer cover 18.

To allow the first indicia 22 within the first area 30 to be visible, at least a portion of the overlay 20 is preferably substantially transparent. Moreover, the first area 30 may include most or all of the area covered by the overlay 20. In the exemplary embodiment described herein, the enclosure 14 is constructed of molded plastic and the ovelay 20 is constructed of a four-sided sheet of transparent plastic material (e.g. thermoplastic resin) that has the approximate size and dimensions of the outer cover 18. Three sides 32, 34, and 36 of the transparent plastic material are margin-bonded to the periphery of the outer cover 18. The fourth side 38 is not bonded to the outer cover. In this arrangement, the overlay 20 and the outer cover 18 form a pocket into which the removable insert 24 and the indicia insert 26 may be disposed. Alternatively, the overlay 20 may be secured to the outer cover 18 on only two sides, thereby forming a sleeve into which materials may be disposed.

In any event, the removable insert 24, which may suitably also be constructed of a thermoplastic resin, has a substantially transparent area 40 that overlaps at least partially with the first area 30 of the overlay 20 when the removable insert 24 is interposed between the outer cover 18 and the overlay 20. The removable insert 24 preferably also includes second indicia 28 secured thereto. For example, the second indicia 28 may be provided on adhesive labels 42, 44 that are affixed to the removable insert 24. Preferably, the removable insert 24 is completely transparent but for such adhesive labels and/or the second indicia 28.

The second indicia 28 may include secondary lender information. In the exemplary embodiment described herein, the second indicia 28 includes a first label 42 containing the secondary lender name and a second label 44 containing a bar code used by the secondary lender for tracking purposes. It will be appreciated that secondary lender information may include other information in other forms. For example, a secondary lender that is a library may have library card and pocket that constitutes the second indicia. Preferably, the second indicia 28 is located in at least a portion of the first area 30 such that the second indicia 28 is viewable without removing the removable insert 24 from the overlay 20.

As discussed above, the substantially transparent area 40 overlaps, at least in part, the first area 30 of the overlay 20. As a result, the first indicia 22, which is typically disposed beneath both the overlay 20 and the removable insert 24, is in large part externally visible. In general, the secondary lender will presumably place the second indicia 28 on portions of the removable insert 24 that do not coincide with the location of important portions of the first indicia 22, such as the work title.

As will be discussed in further detail below, the present invention as exemplified by the above described arrangement allows a primary lender to circulate audio/visual or other works to various secondary lenders without incurring the costs of "cleaning" off labels and the like from the secondary lenders. The practice of circulating works on electronic storage devices to various secondary lenders provides the benefit of affording access to a wide variety of works in local libraries with limited budgets and space. The present invention facilitates this practice and removes one of its primary impediments—the accumulation of adhesive labels and other information from secondary lenders on the protective cover.

Accordingly, one aspect of the invention is a method of lending electronic storage devices to one or more secondary lenders. Preferably, the electronic storage devices are contained within a storage apparatus, such as the storage apparatus 10, that includes an enclosure and an outer cover. The discussion of the method will be made with reference to the structures of the embodiment of the storage apparatus 10 of FIGS. 1, 2, 3, and 4. However, it will be appreciated that the method may be employed with alternative embodiments of storage apparatus, including that of FIGS. 5 and 6.

In general, a primary lender provides the enclosure 14 containing the electronic storage devices 12 to a first secondary lender. As discussed above, the enclosure 14 includes the storage cells 16 and the outer cover 18. The primary lender further provides the overlay 20 disposed on the outer cover 18. The primary lender also provides the first secondary lender with the first indicia 22 which includes information associated with the electronic storage device. The primary lender provides the first indicia 22 such that the first indicia 22 visible through the overlay 20. The first indicia 22 may suitably include a title of the work stored on the electronic storage device and/or other work-specific information. The first indicia 22 may be directly affixed to the outer cover 18 or provided on an indicia insert similar to the indicia insert 26 of FIGS. 1, 2, 3 and 4.

In accordance with the present invention, the primary lender further provides the removable insert 24 to the first secondary lender. As discussed above, the removable insert 24 includes a substantially transparent area through which at least part of the first indicia 22 is visible when the removable insert 24 is disposed within the overlay 20. The first secondary lender may then choose to affix adhesive labels that contain secondary lender information to the removable insert 24. Such secondary lender information may include the name of the secondary lender as well as other information specific to the secondary lender. The removable insert 24 is then replaced in the overlay 20 and the enclosure 14 is put into circulation for lending by the first secondary lender.

After a suitable lending period, the first secondary lender returns the electronic storage devices 12 to the primary lender. At that point, the primary lender receives the electronic storage devices 12, the enclosure 14, the removable insert 24, and the overlay 20 from the first secondary lender. The primary lender may then remove the removable insert 24 if the removable insert contains second indicia provided by the first secondary lender. Thus, if the first secondary lender has affixed various labels to the removable insert 24, the primary lender removes and disposes of the removable insert 24.

The primary lender may then re-circulate the electronic storage devices 12 by providing a subsequent secondary lender with the enclosure 14, the overlay 20, and a second removable insert, the second removable insert configured to receive third indicia provided by the second secondary lender. The third indicia may include information relating to the second secondary lender. When the second secondary lender returns the materials, the primary lender may remove and dispose of the second removable insert.

Thus, the method of lending electronic storage devices according to the present invention eliminates the inconvenience associated with attempting to remove adhesive labels from the outer cover of the enclosure or the pocket of the enclosure every time a secondary lender returns the material. Not only is the removal of adhesive labels inconvenient, it can result in damage to the enclosure and/or pocket. Accordingly, the present invention also increases the life of the cover and/or pocket, which are typically more expensive than the removable insert.

Figure 5:
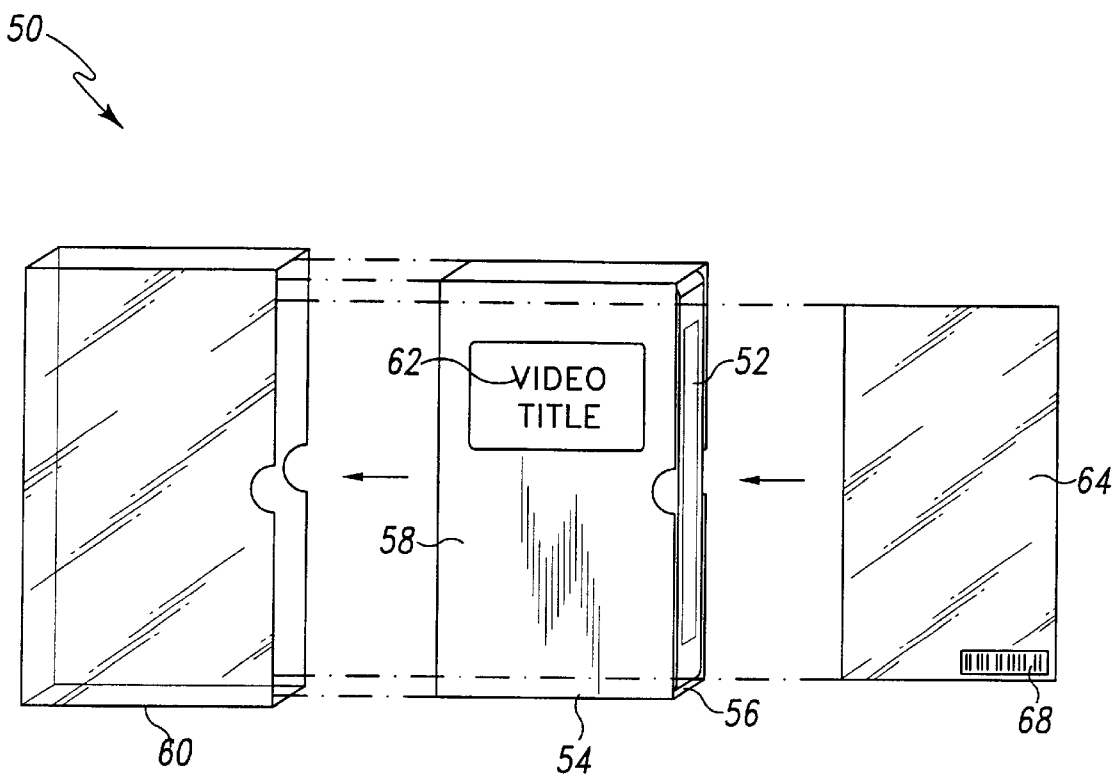
FIG. 5 shows an exploded perspective view of a second exemplary storage apparatus according to the present invention.
Figure 6:
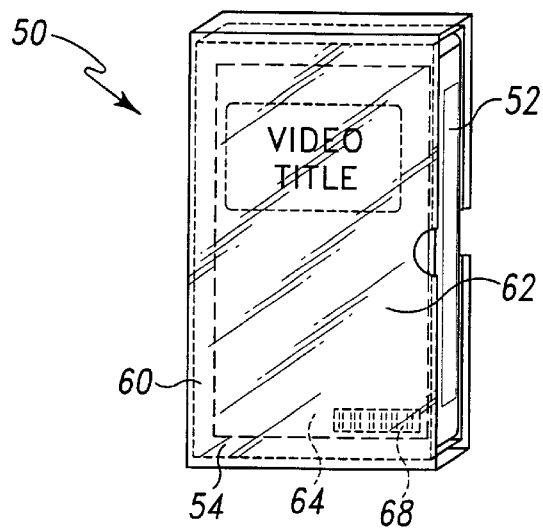
FIG. 6 shows a perspective view of storage apparatus of FIG. 5.

FIGS. 5 and 6 show an alternative embodiment of the present invention. The storage arrangement 50 of FIGS. 5 and 6 basically comprises an enclosure in the form of a box 54 that receives a video tape 52. The box 54 includes one substantially open side that allows the video tape 52 to be inserted and removed. The box 54 has an interior 56 that defines a storage cell for receiving the video tape 52. The exterior 58 of the box 54 forms an outer cover. The first indicia 62 is printed directly on the exterior 58 or outer cover.

A substantially transparent case 60 is configured to receive the box 54 and defines an overlay in which a substantially transparent insert 64 may be received. The substantially transparent insert 64 is formed of plastic and is configured to receive second indicia 68 thereon. The substantially transparent case 60 is formed of plastic having a greater thickness and stiffness than that of the substantially transparent insert 64. The substantially transparent insert 64 may be inserted into the substantially transparent case 60 between the case 60 and the box 54 as shown in FIG. 6. So configured, both the first indicia 62 and the second indicia 68 are visible. However, as discussed above, the substantially transparent insert 64 may readily be replaced by another similar insert having different indicia.

It will be appreciated that the above-described embodiments are merely exemplary and that those of ordinary skill in the art may readily devise their own implementations that incorporate the principles of the present invention and fall within the spirit and scope thereof. By way of example, it is noted that the present invention may be embodied in a variation of the embodiment of FIG. 5 wherein the substantially transparent case 60 is the only enclosure provided for the video tape 52. In such a case the substantially transparent case 60 forms both the outer cover and the overlay, and the first indicia 60 may be affixed directly to the video tape 52.

We claim:

1. An apparatus for storing at least one electronic storage device, the apparatus comprising:
   an enclosure having at least one storage cell, said storage cell configured to receive at least one electronic storage device, the enclosure further comprising an outer cover;
   an overlay attached to the outer cover including a first area in which indicia disposed beneath the overlay is visibly exposed;
   a removable insert received between the outer cover and the overlay, the removable insert having a substantially transparent area that overlaps at least partially with the first area; and
   an indicia insert disposed between the outer cover and the removable insert, the indicia insert including visible first indicia located thereon, the first indicia substantially aligned with the first area.

2. The apparatus of claim 1 wherein the overlay further comprises a substantially transparent overlay.

3. The apparatus of claim 1 wherein the removable insert further contains second indicia secured thereto, the second indicia substantially aligned with the first area.

4. The apparatus of claim 1 wherein the removable insert further contains first indicia secured thereto, the first indicia substantially aligned with the first area.

5. The apparatus of claim 1 wherein the at least one storage cell is configured to receive a magnetic tape.

6. The apparatus of claim 1 wherein the at least one storage cell is configured to receive an optical disk.

7. The apparatus of claim 1 wherein the overlay is attached to the outer cover on three sides to form a pocket therewith.

8. The apparatus of claim 1 wherein the overlay forms at least a portion of the outer cover.

9. An apparatus for storing at least one electronic storage device, the apparatus comprising:
- an enclosure having at least one storage cell, said storage cell configured to receive at least one electronic storage device, the enclosure further comprising an outer cover;
- a substantially transparent overlay disposed on the outer cover;
- a removable insert received between the substantially transparent overlay and the outer cover, the removable insert having a substantially transparent area;
- first indicia disposed proximate the outer cover and aligned with the substantially transparent area such that the first indicia is visible through the substantially transparent overlay and the removable insert.

10. The apparatus of claim 9 wherein said first indicia is disposed on an indicia insert, the indicia insert disposed within the pocket such that the removable insert is disposed between the indicia insert and the substantially transparent overlay.

11. The apparatus of claim 9 wherein the first indicia is secured to the outer cover.

12. The apparatus of claim 9 wherein the removable insert further contains second indicia secured thereto.

13. The apparatus of claim 9 wherein the at least one storage cell is configured to receive a magnetic tape.

14. The apparatus of claim 9 wherein the at least one storage cell is configured to receive an optical disk.

15. A method of lending electronic storage devices to one or more secondary lenders, the electronic storage devices contained within a storage apparatus that includes an enclosure and an outer cover, the method comprising:
- a) providing a first secondary lender with an enclosure, the enclosure including a storage cell containing an electronic storage device and further including an outer cover;
- b) providing an overlay attached to the outer cover;
- c) providing the first secondary lender with first indicia associated with the electronic storage device, the first indicia visible through the overlay; and
- d) providing the first secondary lender with a removable insert, the removable insert including a substantially transparent area through which at least part of the first indicia is visible, the removable insert configured to receive second indicia provided by the first secondary lender, the removable insert further configured to be received between the overlay and the outer cover.

16. The method of claim 15 further comprising:
- a) receiving the enclosure, the removable insert, and the overlay from the first secondary lender after a period of time;
- b) removing the removable insert if the removable insert contains second indicia provided by the first secondary lender.

17. The method of claim 16 further comprising:
- a) providing a subsequent secondary lender with the enclosure, the overlay, and a second removable insert, the second removable insert configured to receive third indicia provided by the second secondary lender.

18. The method of claim 15 further comprising:
- a) receiving the enclosure and the overlay from the first secondary lender after a period of time;
- b) providing a subsequent secondary lender with the enclosure, the overlay, and a second removable insert, the second removable insert configured to receive third indicia provided by the second secondary lender.

19. The method of claim 15 wherein step c) further comprises providing the first secondary lender with first indicia on an indicia insert, the indicia insert configured to be received between the overlay and the outer cover.

20. An apparatus for storing at least one electronic storage device, the apparatus comprising:
- an enclosure having at least one storage cell, said storage cell configured to receive at least one electronic storage device, the enclosure further comprising an outer cover;
- an overlay attached to the outer cover including a first area in which indicia disposed beneath the overlay is visibly exposed;
- a removable insert received between the outer cover and the overlay, the removable insert having a substantially transparent area that overlaps at least partially with the first area of the pocket;
- wherein the outer cover further comprises first indicia disposed thereon, the first indicia substantially aligned with the first area.

21. The apparatus of claim 20 wherein the overlay further comprises a substantially transparent overlay.

22. The apparatus of claim 20 wherein the removable insert further contains second indicia secured thereto, the second indicia substantially aligned with the first area.

* * * * *